Nov. 4, 1969     J. B. SWETT ET AL     3,476,297

CLOSURED CONTAINER AND METHOD OF MAKING SAME

Filed Dec. 20, 1967     2 Sheets-Sheet 1

INVENTORS.
JAMES B. SWETT
CHARLES L. NIXON
BY Paul R Wylie
ATTORNEY

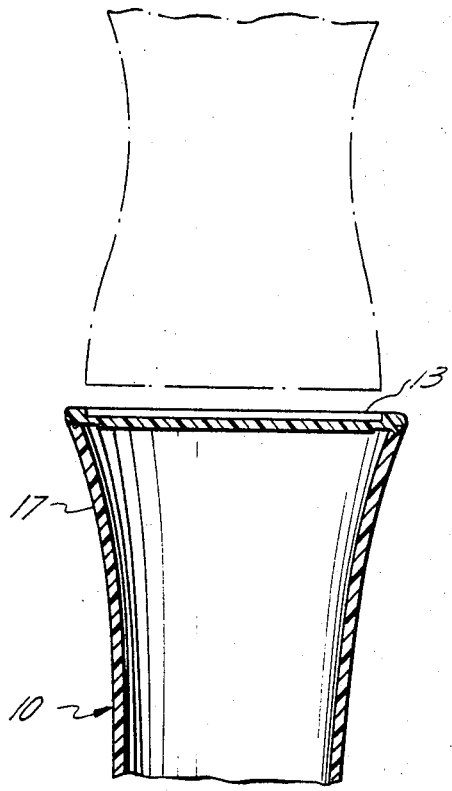
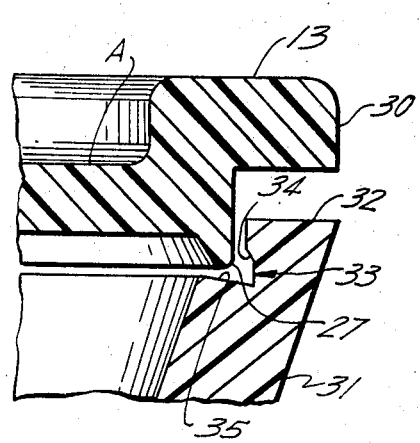
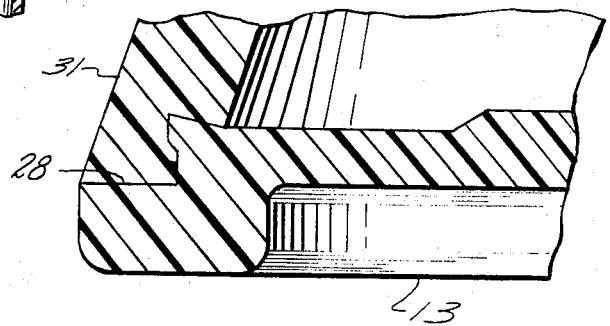

United States Patent Office 3,476,297
Patented Nov. 4, 1969

3,476,297
CLOSURED CONTAINER AND METHOD
OF MAKING SAME
James B. Swett, Barrington, and Charles L. Nixon, Cumberland, R.I., assignors to Rexall Drug and Chemical Company, Los Angeles, Calif., a corporation of Delaware
Filed Dec. 20, 1967, Ser. No. 692,239
Int. Cl. B67d 3/00
U.S. Cl. 222—480                    3 Claims

ABSTRACT OF THE DISCLOSURE

A salt and pepper shaker having a unique internal configuration whereby flow of particulate condiments can be controlled during use. A method of sealing an outwardly flared opening of a hollow plastic body by ultrasonic heat sealing techniques to produce a tight fitted closure even though complete fusion between the closure and the outwardly flared body opening are not obtained.

---

This invention relates generally to closure containers. More specifically, it relates to a dispensing container for particulate condiments including the common table spices, salt and pepper. In one aspect, it relates to a method of making a closured container of particular configuration.

It is well-known that humidity will cause caking of salt and other particulate condiments. It is therefore desirable to utilize condiment dispensers that are adapted to seal against moisture ingress. This is particularly important in areas of high humidity where caking of the contents of a salt shaker may render the shaker unuseable at the table.

A suitable particulate condiment dispenser or "shaker," as it is commonly called, of relatively small capacity that is adapted to seal the contents thereof against moisture is shown in U.S. Patent 2,695,732, issued Nov. 30, 1954 to E. S. Tupper. In actual useage, the shaker shown in that patent is entirely satisfactory for use with small quantities of salt. However, that shaker is not well adapted to be used in a large size for greater quantities of table condiments. A large shaker of that configuration would be top heavy when placed upon a table; and, due to the conical internal contour, a large quantity of salt would be permitted to report to the perforated opening when it was turned upside down for dispensing. Not only would this render the quantity of salt dispensed difficult to control for each individual "shaking"; but, when the shaker was completely full of salt, the center of gravity of the shaker would be such that it would be unstable and could be easily knocked over in normal use.

It is an object of this invention to provide a dispensing container for particulate materials wherein flow can be controlled on the inside thereof without the use of baffles.

A further object of this invention is to provide such a container that can be formed of plastic materials as an injection molded article.

Yet another object of this invention was to provide a dispensing container that can be completely sealed to prevent moisture ingress thereto.

Still another object is to provide a method of manufacturing a container of the foregoing type.

A still further object is to provide a sealed dispensing container and a method of making such a container that would overcome particular problems associated with such methods.

There has been provided, according to the invention, a condiment dispensing container having a unique internal configuration which serves to control the flow of condiment particles during the dispensing thereof. The container is adapted to be completely sealed whereby salt or other table condiments can be suitably used therein without caking.

In another aspect of the invention, a method is provided whereby a container having an outwardly flared edge portion can be tightly sealed by a technique including the use of uniquely formed container closure members and heat sealing procedures. This method finds one application in the sealing of a container embodying the presently preferred form of the condiment dispensing container of the invention.

The invention, including all its aspects, will be more fully described with reference to the accompanying drawings and the following description which illustrate a particular embodiment of the invention.

In the drawings:

FIGURE 7 is a fragmentary cross-sectional view of parts of the container according to the invention shown in pre-assembly relationship and in invented relationship from that shown in FIGURE 3;

FIGURE 8 is another cross-sectional view of the container shown in an assembled relationship with part of the assembly equipment shown in phantom; and, FIGURE 9 is a view in cross-section similar to FIGURE 5 showing a different form of the constructional details of the container.

Figure 3:
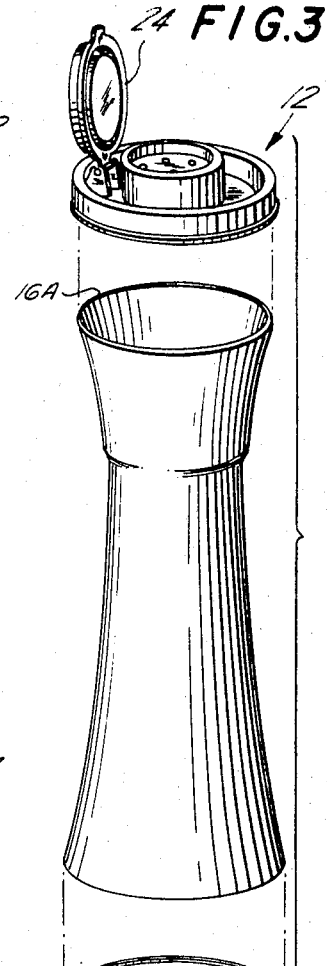
FIGURE 3 is an exploded prospective view of the container and components thereof according to the invention.
Figure 6:
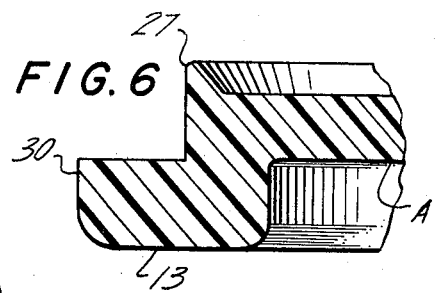
FIGURE 6 is a fragmentary cross sectional view of the outer peripheral portion of the lower closure shown in FIGURE 3.
Figure 4:
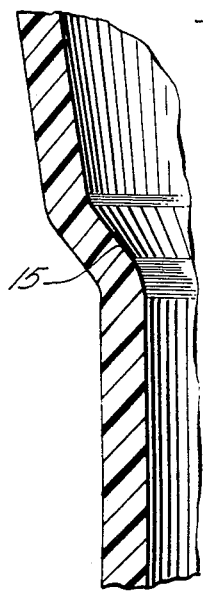
FIGURE 4 is an enlarged detailed view taken within lines 4—4 of FIGURE 2.

Referring now to the drawings, the condiment dispensing container 10 according to the invention includes a central hollow body member 10, dispensing cap 12, and closure 13. As best shown in FIGURE 3, closure member 13 is formed as a separate piece prior to final assembly when it is installed as a permanent fitted seal with hollow body member 10. Dispensing cap 12 is formed as a removable member so that the container can be filled and refilled with various particulate condiments.

Figure 1:
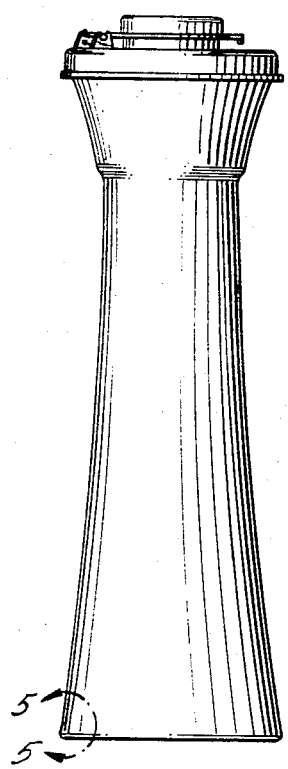
FIGURE 1 is a side elevation view of a container according to the invention.
Figure 2:
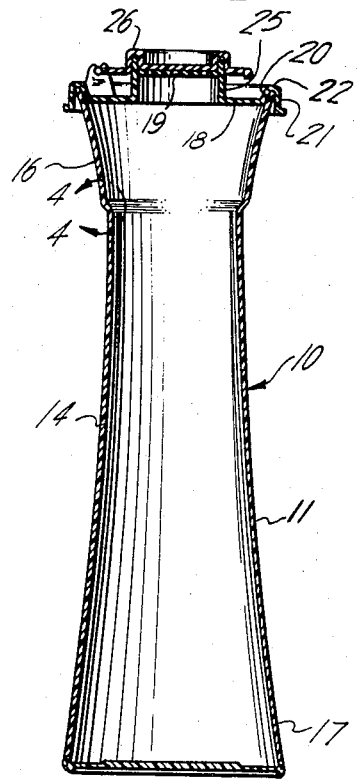
FIGURE 2 is a side elevation view in vertical cross-section.

Hollow body member 10, as best shown in FIGURE 2, is formed as an elongate hollow tube with substantially hyperbolic configuration. The body portion is contoured from the first diverging portion 17 to a converging throat portion 14 and then to a second diverging portion 16. As shown in FIGURE 2, the second diverging portion 16 can have a funnel integrally formed therewith, such funnel comprising the uppermost portion thereof. Connecting the converging throat portion 14 to the funnel portion of second diverging portion 16 is a shouldered protuberance 15. This protuberance, along with the other interior contours of the container, serves to control flow of materials within hollow body member 10. Thus, in a typical situation, the dispensing container as shown in FIGURE 2 can be pictured as having the first diverging portion 17 filled with a particular condiment such as salt to about one-third the height of body member 10. Due to the relatively large volume available at the bottom of the container because of the diverging side walls, the container thus filled has a low center of gravity. This gives stability to the container while not being used. When the container is tipped for dispensing the salt through the openings of dispensing cap 12, the salt in the first diverging portion 17 accelerates toward second diverging portion 16. However, the acceleration of the individual particle movement is retarded by throat portion 14. When the salt reports to the perforations and dispensing cap 12, it is at a velocity substantially less than that which would be imparted to the particles if converging portion 14 were not present. Similarily, when the container is tipped back converging portion 14 again serves to reduce particle acceleration and velocity. In addition, flow retarding protuberance 15 tends to maintain a portion of the particulate salt in the area close to the dispenser cap, provided the container is not completely reinverted to its original vertical position. Thus, once the salt particles have migrated to the dispensing area of the container, there is a tendency for them to remain there. A slight tipping or dashing action will then result in the dispensing of practically any desired quantity of salt particles.

An additional advantage of the invention is obtained in the formation of second diverging portion 16 as a funnel. When dispensing cap 12 is removed from the container, salt, or other particulate condiments can easily be introduced to the container. In the embodiment shown, the formation of second diverging portion as a funnel also provides a simple necked down portion which conveniently forms flow retarding protuberance 15.

Dispensing cap 12, is formed with an imperforate portion 18, a perforated portion 19, and a cap, 24, covering the perforated portion and in sealing relationship with sidewalls 25 thereof. As shown in FIGURE 3, the cap is swingable away from the perforated area for dispensing condiments therethrough. The entire dispensing cap 12 is removable; and when installed on the hollow body member 11, it forms a tight moisture-proof seal. Upstanding outwardly flared peripheral flange 16A of hollow body member 11 fits into U-shaped groove formed by innerwall 20, outerwall 21 and upper connecting wall 22 of the dispensing cap.

The components of the container described are preferably formed by injection-molding thermoplastic materials. In a preferred embodiment dispensing cap is formed of a low density polyethylene, and body member 11 is formed of high density polyethylene or polypropylene. Lower closure 13 can also be formed of polypropylene.

In forming hollow bodies by injection molding, it is of course necessary that none of the body parts be significantly undercut. The reason for this is simply that it would be difficult or impossible to pull the male and female parts of the mold apart and remove the part therefrom. For this reason, an injection molded article such as that shown in FIGURE 2 having an outwardly flared bottom configuration, perforce, requires a separately formed assemblable lower closure.

Figure 5:
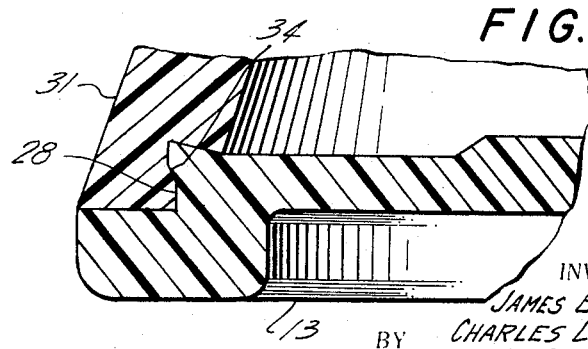
FIGURE 5 is a cross-sectional view of the lower portion of the container according to the invention taken within lines 5—5 of FIGURE 1.

As shown in FIGURE 7, lower closure 13 is formed with an outwardly extending flange 30 and an upwardly extending peripheral protuberance 27. The bottom portion of hollow body member 11 is formed having an outwardly flared upstanding peripheral flange 31 extending to a peripheral rim terminus 32. The rim of peripheral flange portion 31 has an undercut groove shown generally at 33 on the inside wall thereof adjacent to the peripheral rim terminus 32. After the hollow body member and closure have been formed by injection molding, the closure is positioned on the hollow body member in a manner as shown in FIGURE 7. Heat is then applied locally to peripheral protuberance 27 which is of shape and dimension to flow upon heating into annular undercut groove 33 of hollow body member 11 to form a permanently fitted tight seal. The closure is tightly fitted by either being completely fused along line 28 as shown in FIGURE 9, or intimately fitted along line 28 as shown in FIGURE 5.

Although various methods of locally applying heat to protuberance 27 can be used, the preferred method is that of conventional ultrasonic heat sealing. If this method is used it is preferred to have undercut groove 33 formed with an outwardly flared angled peripheral surface 34 and a substantially planar outwardly extending peripheral surface portion 35 that extends from the inside of outwardly flared upstanding peripheral flange 31 to an intersection with the outwardly flared angled peripheral surface 34. Peripheral protuberance 27 is formed to provide a point contact with surface 35 when the closure is initially positioned on the hollow body. Thus, a tight seal can be formed by the usual method of ultrasonic welding, or heat sealing, wherein the closure member is vibrated at high frequency against the hollow body member. This method is best shown with respect to FIGURE 8, wherein the horn or vibration imparting instrument of the ultrasonic sealing equipment is shown positioned above closure 13. When the horn is applied to the closure, protuberance 27 serves as an energy director and the energy applied at surface 35 melts the rim and, ideally, some of the surface portion to form an integrally fused article. In order to effect a tight fusing of the materials it has been found that the wall thickness of closure 13 at point "A" should be substantially equal to the distance between surface 35 and surface 32. However, even though integral fusion of the parts is not completely obtainable, it can readily be seen that the material of annular protuberance 27 will flow into undercut groove 33, thus still forming a tight permanent seal of the closure to the hollow body member.

The foregoing describes a specific embodiment of our invention. Variation can be had without departing from the invention, the scope of which is defined by the following claims.

We claim:

1. A plastic dispenser for condiments or the like comprising:
   an elongated central hollow body member with two terminal extremities and having a substantially planar lower closure permanently attached at one extremity thereof and a perforated dispensing cap adapted to interfit in moisture proof relationship with the other extremity thereof,
   said central hollow body member being internally contoured such that a throat portion and a smoothly rounded protuberance are positioned adjacent said other extremity, said protuberance also being the position from which first and second diverging portions extend to said extremities of the hollow body member, and in which said one extremity includes a peripherally extending undercut groove positioned inwardly of said hollow body member and adapted to accommodate a portion of said lower closure in permanent sealing relationship.

2. A plastic dispenser for condiments according to claim 1 wherein said central hollow body has inside and outside walls and the one extremity of said hollow body includes a substantially planar peripheral rim intersecting said outside wall and into which is formed the peripherally extending undercut groove, said undercut groove being positioned on said inside wall and being comprised of a substantially planar outwardly extending peripheral surface portion adjacent said rim and an outwardly flared angled peripheral surface that intersects both said rim and said surface portion.

3. A plastic dispenser for condiments according to claim 2 wherein said lower closure wall is of a thickness approximating the distance between said peripheral rim and said surface portion.

References Cited

UNITED STATES PATENTS

| | | | |
|---|---|---|---|
| 74,869 | 2/1869 | Wattis | 222—565 X |
| 360,571 | 4/1887 | Fatjo | 222—565 X |
| 2,612,292 | 9/1952 | Von Duyke | 222—498 X |
| 2,652,383 | 9/1953 | Roop | 222—565 X |
| 2,695,732 | 11/1954 | Tupper | 222—480 X |
| 2,986,309 | 5/1961 | Larson | 222—563 X |
| 3,131,870 | 5/1964 | Henchert | 222—480 X |
| 3,302,813 | 2/1967 | Schaich | 215—1.5 X |

FOREIGN PATENTS 964,173  5/1957  Germany.

WALTER SOBIN, Primary Examiner

U.S. Cl. X.R.

222—564

UNITED STATES PATENT OFFICE
CERTIFICATE OF CORRECTION

Patent No. 3,476,297                          November 4, 1969

James B. Sweet et al.

It is certified that error appears in the above identified patent and that said Letters Patent are hereby corrected as shown below:

In the heading to the printed specification, lines 5 and 6, "Rexall Drug and Chemical Company" should read -- Dart Industries Inc. --.

Signed and sealed this 24th day of March 1970.

(SEAL)
Attest:

Edward M. Fletcher, Jr.
Attesting Officer

WILLIAM E. SCHUYLER, JR.
                                                Commissioner of Patents